United States Patent [19]

Palett et al.

[11] Patent Number: 4,875,229

[45] Date of Patent: Oct. 17, 1989

[54] VEHICLE TELEPHONE WITH CALL ANSWERING AND RECORDING MEANS

[75] Inventors: Anthony P. Palett, Farmington Hills, Mich.; A. Gil Spear Jr., Vero Beach, Fla.

[73] Assignee: Anthony P. Palett, Farmington Hills, Mich.

[21] Appl. No.: 295,958

[22] Filed: Jan. 11, 1989

[51] Int. Cl.[4] .............................................. H04M 1/02
[52] U.S. Cl. ...................................... 379/58; 379/128; 381/86; 455/90
[58] Field of Search ...................... 379/58, 63, 428, 67, 379/68; 381/86; 455/90

[56] References Cited

U.S. PATENT DOCUMENTS

| D. 294,495 | 1/1988 | Nissley | D12/191 |
|---|---|---|---|
| 4,056,696 | 11/1977 | Meyerle et al. | 379/58 |
| 4,553,534 | 11/1985 | Stiegler | 128/241 |
| 4,646,344 | 2/1987 | Goldhorn et al. | 379/58 |
| 4,706,273 | 10/1987 | Spear et al. | 379/58 |
| 4,736,410 | 4/1988 | Nisnida et al. | 379/354 |

FOREIGN PATENT DOCUMENTS

| 0138134 | 8/1983 | Japan | 379/58 |
|---|---|---|---|
| 0085632 | 5/1985 | Japan | 379/58 |
| 2181624 | 4/1987 | United Kingdom | 379/58 |

OTHER PUBLICATIONS

Joe Lewo, U.S. Patent Application S.N. 07/187,999 filed 04/29/88.
Joe Lewo, U.S. Patent Application S.N. 07/188,009 filed 04/29/88.
Joe Lewo, U.S. Patent Application S.N. 07/258,181 filed 10/17/88.

*Primary Examiner*—Robert Lev
*Attorney, Agent, or Firm*—Alex Rhodes

[57] ABSTRACT

A unitary sun visor and cellular telephone with means for transmitting and receiving telephone cells, answering incoming calls when a vehicle is unoccupied for maintaining contact with others, recording incoming calls when a vehicle is in motion, recording information, such as travel expenses and dictation for subsequent transcribing while on the road, and playing prerecorded tapes while on the road. The unitary apparatus is adapted to be mounted to a vehicle's body structure above the vehicle's instrument panel, forward of the front seat occupant, and has an outer panel with opposing surfaces which is adjustable to a downward extending shading position and to an upward non-shading position adjacent to the vehicle's headliner. One of the panel surfaces is in confronting relationship to the operator of the telephone when the panel is in the shading position and has controls and an aphanumeric display for operating the telephone and call answering and recording means which are in an operator's forward field of vision and are readily accessible without distracting the operator's attention from the road.

8 Claims, 1 Drawing Sheet

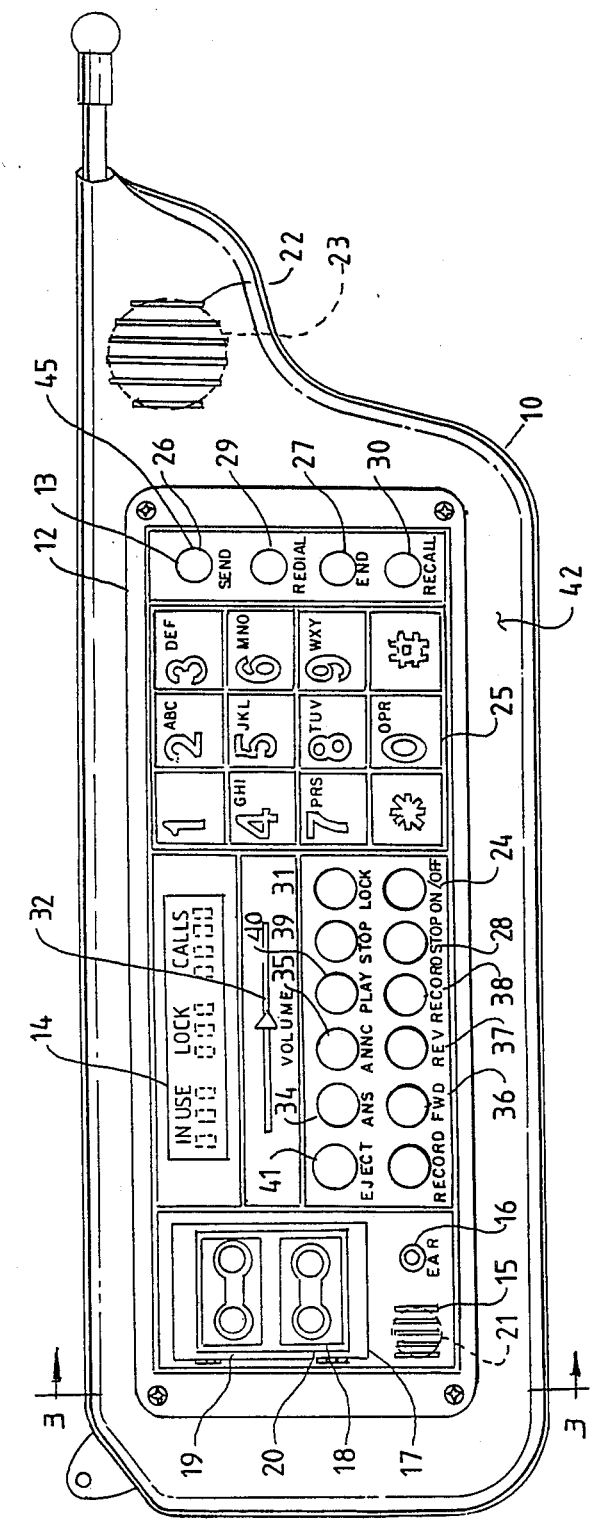
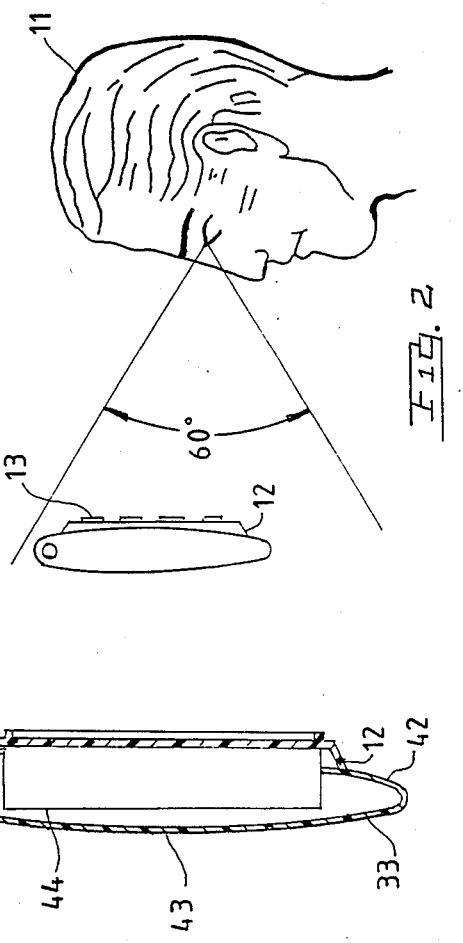
Fig. 1
Fig. 2
Fig. 3

VEHICLE TELEPHONE WITH CALL ANSWERING AND RECORDING MEANS

BACKGROUND OF THE INVENTION

This invention relates to mobile telephones and more particularly to a unitary sun visor and cellular telephone with call answering and recording means.

The cellular telephone is a popular accessory for executives, business men, repairmen, salesmen, physicians and other persons who need to communicate with others from their motor vehicles.

One aspect of prior art vehicle telephone systems is that there are no provisions for answering and recording incoming calls when vehicles are unoccupied.

Another aspect of prior art vehicle telephone systems is that there are no means for recording incoming messages when the vehicles are in motion.

It is apparent from the foregoing that a vehicle telephone with call answering and recording means would provide benefits heretofore unavailable.

SUMMARY OF THE INVENTION

The present invention is directed toward a unitary vehicle sun visor and cellular telephone with incoming call answering and recording means.

One benefit of the invention is that a person can maintain contact with others when his vehicle is unoccupied.

Another benefit is that a vehicle operator can record incoming calls when his vehicle is in motion.

Another benefit is that information, such as travel expenses and dictation can be recorded for subsequent transcribing while on the road.

Another benefit is that pre-recorded tapes can be played while on the road.

The unitary visor and telephone is adapted to be mounted above the instrument panel of a vehicle forward of a front seat occupant to the vehicle's body structure. The unitary apparatus has an outer panel with opposing surfaces which is adjustable to a downward extending shading position and to an upward non-shading position adjacent to the vehicle's headliner. One of the panel surfaces is in confronting relationship to the operator of the telephone when the panel is in the shading position and the opposite of said surface is in confronting relationship to the operator when the panel is in the non-shading position.

Controls are provided for operating the telephone and call answering and recording means. The controls are located on the face of the panel which confronts the operator when the panel is in the shading position. Another benefit of the invention is that the controls are in the operator's forward field of vision and are readily accessible for placing outgoing calls and/or operating the recording means without distracting the operator's attention from the road. This is particularly useful when the operator is the driver of the vehicle.

There is also provided within the operator's forward field of vision a large alphanumeric display for prominently displaying the telephone numbers of outgoing calls and other information, such as "LOCK", when the telephone is electronically locked by the user of the telephone.

Other features and benefits as well as objects of the invention will become apparent from the ensuing description and accompanying drawings which disclose the invention in detail.

BRIEF DESCRIPTION OF THE DRAWINGS

FIG. 1 is a front elevation view of a motor vehicle sun visor containing a cellular telephone in the downward shading position of the visor.

FIG. 2 is a right side view of the sun visor shown in FIG. 1 and a driver which is drawn to a reduced scale from FIG. 1.

FIG. 3 is a cross-sectional view taken on the line 3—3 of FIG. 1.

DETAILED DESCRIPTION OF THE PREFERRED EMBODIMENT

Referring now to the drawings, wherein like numerals designate like and corresponding parts throughout the several views, the particular embodiment 10 disclosed in FIGS. 1 and 2, for purposes of illustrating the invention, includes a unitary vehicle sun visor and cellular telephone with call answering and recording means for sending, receiving, answering and recording telephone calls. The unitary sun visor and telephone 10 is positioned ahead of a front seat occupant user 11 and has a panel 33 with first 42 and second 43 oppositely disposed faces which is selectively adjustable between a downward shading position shown in FIG. 2 whereat the apparatus 10 is in a substantially vertical position away from the vehicle's headliner (not shown) and the first face 42 confronts the user 11 of the telephone and to an upward substantially horizontal position (not shown) whereat the first face 42 is concealed from the user 11.

On the first face 42 of the panel 33 which confronts the user 11 when the apparatus 10 is in a shading position is a plate 12 with controls 13 for transmitting, receiving, answering and recording telephone calls. Behind the faceplate 12 there is a housing 44 which encloses conventional mechanical and electronic components (not shown) for the cellular telephone with call answering and recording means 10. On the upper center portion of the faceplate 12 there is a horizontal alphanumeric display 14 for displaying outgoing telephone numbers and messages. At the lower left corner of the faceplate 12 there are grille openings 15 for a microphone 21 and to the right of the grille opening there is a jack 16 for connecting an auxiliary earphone (not shown). At the upper right end of the unitary visor and telephone 10 are grille openings 22 for a speaker 23 which is mounted behind the faceplate 12. At the side of the unitary visor and telephone 10 there is a door 17 for gaining access to a pair of recording tapes 18. The tapes 18 which are directly behind the door 17 are comprised of an endless announcement tape 19 and a recording tape 20. A remote speaker (not shown) such as an existing radio speaker may be used in lieu of the self contained speaker 23 for broadcasting incoming messages.

With reference to FIG. 2, the controls 13 are comprised of two groups, viz., a first group, at the right side of the face plate 12, for receiving and transmitting telephone calls and a second group, at the center of the face plate 12, for answering and recordigg telephone calls. The first group is comprised of a square array of push buttons 25 for placing outgoing calls, an "ON/OFF" control 24 adjacent to the lower left corner of the square array for supplying power which is common to both groups a "LOCK" control 31, directly above the "ON/OFF" control 24, for preventing unauthorized use of the telephone, a "STORE" 28 control to the left of the "ON/OFF" control 24 for storing telephone numbers in the memory of the telephone, and a vertical array to the right of the square array 25, comprised of a "SEND" control 26 for transmitting outgoing calls, and "END" control 27 for terminating telephone calls, a "REDIAL" control 29 for redialing telephone numbers, a "RECALL" control 30 for recalling stored telephone numbers from memory, and a "VOLUME" control 32 common to both groups. Alternatively, an available type voice actuating means (not shown) may be provided in lieu of the "SEND" control for transmitting outgoing telephone calls.

The second group of controls is a pair of horizontal linear arrangements of controls in the center of the face plate 12 comprised of an "ANS" control 34 for answering incoming calls when the vehicle is unoccupied, and "ANNC" control 35 for storing a call answering announcement on the announcement tape 19, a "FWD" control 36 for advancing the message tape, a "REW" control 37 for rewinding the message tape 20, a "RECORD" control 38 for recording messages on the message tape, a "STOP" control 39 for stopping the message tape 28, a "PLAY" control 40 for playing back the message tape 20 and an "EJECT" control 41 for opening the tape door 17.

With reference to FIG. 2 wherein is shown the head of a driver 11 and the unitary apparatus 10 in the operative downward shading position, it will be observed that the controls 13 and aphanumeric display 14 are positioned within the driver's forward field of vision for viewing a road.

The manner of using the cellular telephone 10 is as follows. The telephone is locked by pressing the "LOCK" control 31 and unlocked by entering a three digit secret code in the square array 25 and depressing the "LOCK" control 31. When the telephone is locked, word "LOCKED" is displayed in the alphanumeric display 14. A telephone call is placed in three alternate ways. The usual way of placing a call is to enter a telephone number in the square array 25 and depress the "SEND" control 26. A frequently called number may be placed by depressing the "RECALL" control 30, entering a single or double digit pre-assigned number in the square array 25 and depressing the "SEND" control 26. A previous call may be placed by depressing the "REDIAL" control 29.

When a telephone number is placed, the telephone number of the outgoing call is displayed on the alphanumeric display 14. Telephone numbers are stored in memory by first entering the numbers in the square array 25, depressing the "STORE" control 28 and assigning an address by entering a single or two digit number in the square array 25.

A call is answered and recorded in the following manner. A call announcement message is initially stored on the announcement tape 19 by depressing the "ANNC" 35 control and reciting the message into the microphone 21 behind the grille 15. The call answering sequence is activated by depressing the "ANS" control. After a pre-set number of unanswered rings, by way of example five, the pre-recorded message stored on the announcement tape 19 instructs the caller to leave his message which is automatically recorded on the message tape 20. When one or more incoming calls are recorded, the word "CALL" is displayed on the alphanumeric display 14.

Calls are recorded on the recording tape 20 by an operator by depressing the "RECORD" control 38, and played back by depressing the "RWD" control 37 to rewind the recording tape 20 followed by depressing the "PLAY" control 40.

Information such as travel expenses and dictation for subsequent transcribing are recorded when the telephone 10 is not in use by simultaneously depressing the "RECORD" 38 and "FWD" 36 controls. Pre-recorded tapes are played back by inserting the tape into the unitary apparatus 10 and depressing the "PLAY" control 40. The recording tape can be rapidly advanced by depressing the "FWD" control 36 and stopped by depressing the "STOP" control 39. The volume of incoming messages and for playback of the recording tape is adjusted by the "VOLUME" control 32.

From the foregoing, it will be appreciated that the present invention provides a unitary motor vehicle sun visor and cellular telephone with call answering and recording means which is convenient, easy to use, and can be safely operated by a vehicle driver when his vehicle is in motion. Moreover, the invention provides other important benefits heretofore unavailable in a vehicle cellular telephone. Although but a single embodiment of my invention has been illustrated and described, it will be understood that other embodiments can be provided by changes in the material, size, shape and arrangement of its parts without departing from the spirit thereof.

We claim:

1. A unitary vehicle sun visor and telephone apparatus with telephone call answering and recording means adapted to be operated by an occupant of a motor vehicle, said unitary apparatus being positioned ahead of the occupant and having a panel with first and second oppositely disposed faces mounted for rotation about an axis, said panel being selectively adjustable to a position whereat said first surface is in confronting relationship to said occupant for shading the occupant and to another position whereat said first surface is in concealed relationship to said occupant; telephone means mounted in said panel for transmitting and receiving messages to and from said occupant; telephone answering means mounted in said panel and cooperating with said telephone means to answer telephone calls when the vehicle is unoccupied; recording means mounted in said panel and cooperating with said telephone means to record incoming telephone messages when said vehicle is occupied or unoccupied; a face plate mounted on one of said surfaces of said panel; and controls mounted in said face plate for operating said telephone and said call answering and recording means.

2. The unitary sun visor and telephone with call answering and recording means recited in claim 1 wherein said face plate and said controls are mounted on said first surface of said panel which confronts said occupant when said panel is in said shading position.

3. The unitary sun visor and telephone with call answering and recording means recited in claim 1 further comprising an alphanumeric display mounted in said face plate for displaying outgoing telephone calls and messages to the operator of said telephone.

4. The unitary sun visor and telephone with call answering and recording means recited in claim 1 further comprising a means for operatively connecting an external earphone to said telephone.

5. The unitary sun visor and telephone with call answering and recording means and controls recited in claim 1 wherein the controls for operating said telephone means comprise a square array of push buttons for placing outgoing calls, a control for supplying electrical power, a control for preventing unauthorized use of the telephone, a control for storing telephone numbers in a memory of the telephone, a control for transmitting outgoing calls, a control for terminating a telephone call, a control for redialing a telephone number, a control for recalling a stored telephone number from memory, and a control for adjusting the volume of an incoming telephone call.

6. The unitary sun visor and telephone with call answering and recording means recited in claim 1 further comprising a voice actuating means for transmitting outgoing telephone calls.

7. The unitary sun visor and telephone with call answering and recording means recited in claim 1 wherein said answering and recording means comprises an endless tape for storing call answering announcement; a control for supplying power; a tape for recording telephone calls; a control for answering incoming calls when the vehicle is unoccupied; a control for storing a call answering announcement on an announcement tape; a control for advancing a recording tape; a control for rewinding the recording tape; a control for recording telephone calls on the message tape, a control for stopping the recording tape; a control for playing back the recording tape, and a control for adjusting the playback volume of the recording tape.

8. A unitary vehicle sun visor and telephone apparatus adapted to be operated by an occupant of a motor vehicle, said unitary apparatus having an outer panel with first and second oppositely disposed surfaces for rotation about an axis between a position for shading the occupant whereat said first face confronts the operator of the telephone and a position whereat said first face is concealed from the operator; a telephone with call answering and recording means mounted in said panel for transmitting, receiving, answering and recording telephone calls; and controls mounted on said first face for operating said telephone with call answering and recording means.

* * * * *